US 11,400,803 B1

(12) United States Patent
Zhang et al.

(10) Patent No.: US 11,400,803 B1
(45) Date of Patent: Aug. 2, 2022

(54) VEHICLE DRIVELINE COMPONENT

(71) Applicant: Ford Global Technologies, LLC, Dearborn, MI (US)

(72) Inventors: Dengfu Zhang, Northville, MI (US); Chin-Yuan Perng, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/383,149

(22) Filed: Jul. 22, 2021

(51) Int. Cl.
| | |
|---|---|
| *B60K 6/22* | (2007.10) |
| *F16H 57/021* | (2012.01) |
| *B60K 17/24* | (2006.01) |
| *F16H 57/04* | (2010.01) |
| *F16C 3/02* | (2006.01) |
| *F16H 57/02* | (2012.01) |
| *B60K 6/405* | (2007.10) |

(52) U.S. Cl.
CPC ............... *B60K 6/22* (2013.01); *B60K 17/24* (2013.01); *F16C 3/02* (2013.01); *F16H 57/021* (2013.01); *F16H 57/043* (2013.01); *F16H 57/0428* (2013.01); *F16H 57/0471* (2013.01); *F16H 57/0472* (2013.01); *B60K 6/405* (2013.01); *B60Y 2200/92* (2013.01); *B60Y 2400/79* (2013.01); *F16C 2326/06* (2013.01); *F16H 57/0483* (2013.01); *F16H 2057/02034* (2013.01); *F16H 2057/02052* (2013.01)

(58) Field of Classification Search
IPC ............... B60K 6/22,17/24, 6/405; F16C 3/02, 2326/06; F16H 57/021, 57/0428, 57/043, 57/0471, 57/0472, 57/0483, 2057/02034, 2057/02052; B60Y 2200/92, 2400/79
See application file for complete search history.

(56) References Cited

U.S. PATENT DOCUMENTS

| | | | |
|---|---|---|---|
| 4,582,170 A | * | 4/1986 | Horiuchi ............... F16J 15/162 184/6.12 |
| 10,550,929 B2 | | 2/2020 | Ahn et al. |

(Continued)

FOREIGN PATENT DOCUMENTS

| | | |
|---|---|---|
| EP | 3657646 | 5/2020 |
| JP | 4701587 | 6/2011 |

(Continued)

*Primary Examiner* — Colby M Hansen
(74) *Attorney, Agent, or Firm* — Burris Law, PLLC (57) ABSTRACT

A vehicle driveline component includes a hollow motor shaft and a link shaft. The hollow motor shaft is supported for rotation about an axis including a plurality of grooves extending along an interior surface of the motor shaft. The link shaft cooperates with the interior surface of the motor shaft and the grooves to define a space between the link shaft and the motor shaft. The grooves are configured to force liquid lubricant to flow through the space in a longitudinal direction relative to the link shaft and the motor shaft when the motor shaft rotates. The link shaft includes a lubricant passage, a first connecting lubricant passage, and a second connecting lubricant passage. The lubricant passage extends along a longitudinal direction of the link shaft. The first and second connecting lubricant passages provide fluid communication between the longitudinal lubricant passage and the space.

20 Claims, 4 Drawing Sheets

(56) References Cited

U.S. PATENT DOCUMENTS

| | | | |
|---|---|---|---|
| 10,738,668 B2 | 8/2020 | Walker et al. | |
| 2006/0213303 A1* | 9/2006 | Shigemi | F16J 15/324 |
| | | | 277/354 |
| 2014/0349802 A1* | 11/2014 | Steiner | F16C 19/505 |
| | | | 384/462 |

FOREIGN PATENT DOCUMENTS

| | | |
|---|---|---|
| JP | 4751378 | 8/2011 |
| JP | 6160633 | 7/2017 |

\* cited by examiner

VEHICLE DRIVELINE COMPONENT

FIELD

The present disclosure relates to a driveline component and a vehicle having a driveline component.

BACKGROUND

The statements in this section merely provide background information related to the present disclosure and may not constitute prior art.

Hybrid electric powertrains generally include an electric motor and an internal combustion engine (ICE) that can operate independently or in combination depending on the driving conditions, the state of charge of a battery, and the power source that most efficiently meets the current power demand imposed by the vehicle operator. Hybrid electric powertrains sometimes include power transfer units (PTUs), front drive units (FDUs), rear drive units (RDUs), or a combination of these units to transmit torque. The PTUs, FDUs, RDUs typically include gears, shafts, bearings, seals, and other components. Lubricant held in a unit typically makes its way to these components to lubricate and/or cool the components.

SUMMARY

This section provides a general summary of the disclosure and is not a comprehensive disclosure of its full scope or all of its features.

In one form, the present disclosure provides a vehicle driveline component including a hollow motor shaft and a link shaft. The hollow motor shaft is supported for rotation about an axis and includes a plurality of grooves extending along an interior surface of the motor shaft. The link shaft extends coaxially through the motor shaft and is supported for rotation about the axis relative to the motor shaft. An exterior surface of the link shaft cooperates with the interior surface of the motor shaft and the grooves to define a space between the link shaft and the motor shaft. The grooves are configured to force liquid lubricant to flow through the space in a longitudinal direction relative to the link shaft and the motor shaft when the motor shaft rotates. The link shaft includes a longitudinal lubricant passage, a first connecting lubricant passage, and a second connecting lubricant passage. The longitudinal lubricant passage extends along a longitudinal direction of the link shaft. The first and second connecting lubricant passages provide fluid communication between the longitudinal lubricant passage and the space. The first and second connecting lubricant passages being spaced apart along an axial direction of the axis.

In some configurations of the vehicle driveline component of the above paragraph, the plurality of grooves are helical shape.

In some configurations of the vehicle driveline component of any one or more of the above paragraphs, the plurality of helical grooves extend an entire length of the motor shaft and are configured to pump liquid lubricant from one axial end of the motor shaft to an opposite axial end of the motor shaft.

In some configurations of the vehicle driveline component of any one or more of the above paragraphs, the first connecting lubricant passage is located at a first axial end of the link shaft and the second connecting lubricant passage is located at an opposed second axial end of the link shaft.

In some configurations of the vehicle driveline component of any one or more of the above paragraphs, the first and second connecting lubricant passages extend in a radial direction from the lubricant passage toward an outer surface of the link shaft.

In some configurations of the vehicle driveline component of any one or more of the above paragraphs, the vehicle driveline component includes an electric motor having a rotor. The rotor is coupled to the motor shaft for common rotation about the axis.

In some configurations of the vehicle driveline component of any one or more of the above paragraphs, the vehicle driveline component includes a housing, a first bearing, and a second bearing. The first bearing rotatably supports the motor shaft at a first axial end of the motor shaft. The second bearing rotatably supports the motor shaft at a second axial end of the motor shaft that is opposite the first axial end. Liquid lubricant flowing through the space in the longitudinal direction cools the first and second bearings.

In some configurations of the vehicle driveline component of any one or more of the above paragraphs, the vehicle driveline component includes a housing, a bearing, and a seal. The bearing rotatably the link shaft at an axial end of the link shaft. The seal is engaged with the link shaft and the housing, and located axially outwardly along the axial end of the link shaft relative to the bearing.

In some configurations of the vehicle driveline component of any one or more of the above paragraphs, the lubricant passage is located at a center of the link shaft.

In another form, the present disclosure provides a vehicle driveline component including a hollow motor shaft and a link shaft. The hollow motor shaft is supported for rotation about an axis and includes a plurality of helical grooves extending along an interior surface of the motor shaft. The link shaft extends coaxially through the motor shaft and is supported for rotation about the axis relative to the motor shaft. An exterior surface of the link shaft cooperates with the interior surface of the motor shaft and the grooves to define a space therebetween. The link shaft includes a longitudinal lubricant passage, a plurality of first connecting lubricant passages, and a plurality of second connecting lubricant passages. The longitudinal lubricant passage extends along a longitudinal direction of the link shaft. The plurality of first and second connecting lubricant passages provide fluid communication between the longitudinal lubricant passage and the space. The space, the plurality of first and second connecting lubricant passages, and the longitudinal lubricant passage form a lubricant circuit configured to permit liquid lubricant received from a sump to enter a first axial end of the space, be forced to an opposite axial end of the space by rotation of the helical grooves, flow through the plurality of first connecting lubricant passages to the longitudinal lubricant passage, flow axially through the longitudinal lubricant passage to the plurality of second connecting lubricant passages, and return to the sump via the plurality of second connecting lubricant passages.

In some configurations of the vehicle driveline component of the above paragraph, the plurality of first connecting lubricant passages are located at a first axial end of the link shaft and the plurality of second connecting lubricant passages are located at an opposed second axial end of the link shaft.

In some configurations of the vehicle driveline component of any one or more of the above paragraphs, the plurality of first connecting lubricant passages and the plurality of second connecting lubricant passages extend in a radial direction.

In some configurations of the vehicle driveline component of any one or more of the above paragraphs, the plurality of first and second connecting lubricant passages extend in a radial direction.

In some configurations of the vehicle driveline component of any one or more of the above paragraphs, the plurality of helical grooves are positioned between the plurality of first and second connecting lubricant passages.

In some configurations of the vehicle driveline component of any one or more of the above paragraphs, the plurality of first and second connecting lubricant passages are circumferentially disposed around the lubricant passage.

In some configurations of the vehicle driveline component of any one or more of the above paragraphs, the vehicle driveline component includes a housing, a first bearing, a second bearing, a third bearing, and a seal. The first bearing rotatably supports the motor shaft at a first axial end of the motor shaft. The second bearing rotatably supports the motor shaft at a second axial end of the motor shaft that is opposite the first axial end. The third bearing rotatably supports the link shaft at an axial end of the link shaft. The seal is engaged with the link shaft and the housing, and located axially outwardly along the axial end of the link shaft relative to the third bearing. Liquid lubricant flowing through the space in the longitudinal direction cools the first and second bearings.

In yet another form, the present disclosure provides a vehicle driveline component that includes a vehicle component, a housing defining a sump, a hollow motor shaft, and a link shaft. The hollow motor shaft is disposed within the housing and is supported for rotation about an axis. The hollow motor shaft includes a plurality of helical grooves extending along an interior surface of the motor shaft. The link shaft is disposed within the housing and extends coaxially through the motor shaft. The link shaft is supported for rotation about the axis relative to the motor shaft. An exterior surface of the link shaft cooperates with the interior surface of the motor shaft and the helical grooves to define a space between the link shaft and the motor shaft. The grooves are configured to force liquid lubricant to flow through the space in a longitudinal direction relative to the link shaft and the motor shaft when the motor shaft rotates. The link shaft includes a longitudinal lubricant passage, a plurality of first connecting lubricant passages, and a plurality of second connecting lubricant passages. The longitudinal lubricant passage extends along a longitudinal direction of the link shaft. The first and second connecting lubricant passages provide fluid communication between the longitudinal lubricant passage and the space. The first and second connecting lubricant passages are spaced apart along an axial direction of the axis. The space, the plurality of first and second connecting lubricant passages, and the longitudinal lubricant passage form a lubricant circuit configured to permit liquid lubricant received from the sump to enter a first axial end of the space, be forced to an opposite axial end of the space by rotation of the helical grooves, flow through the plurality of first connecting lubricant passages to the longitudinal lubricant passage, flow axially through the longitudinal lubricant passage to the plurality of second connecting lubricant passages, and return to the sump via the plurality of second connecting lubricant passages.

In some configurations of the vehicle driveline component of the above paragraph, the vehicle component is a differential. The link shaft is operatively connected to the differential.

In some configurations of the vehicle driveline component of any one or more of the above paragraphs, the vehicle driveline component includes a first bearing and a second bearing. The first bearing rotatably supports the motor shaft at a first axial end of the motor shaft. The second bearing rotatably supports the motor shaft at a second axial end of the motor shaft that is opposite the first axial end.

In some configurations of the vehicle driveline component of any one or more of the above paragraphs, the vehicle driveline component includes a bearing and a seal. The bearing rotatably supports the link shaft at an axial end of the link shaft. The seal is engaged with the link shaft and the housing, and located axially outwardly along the axial end of the link shaft relative to the bearing.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

and

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
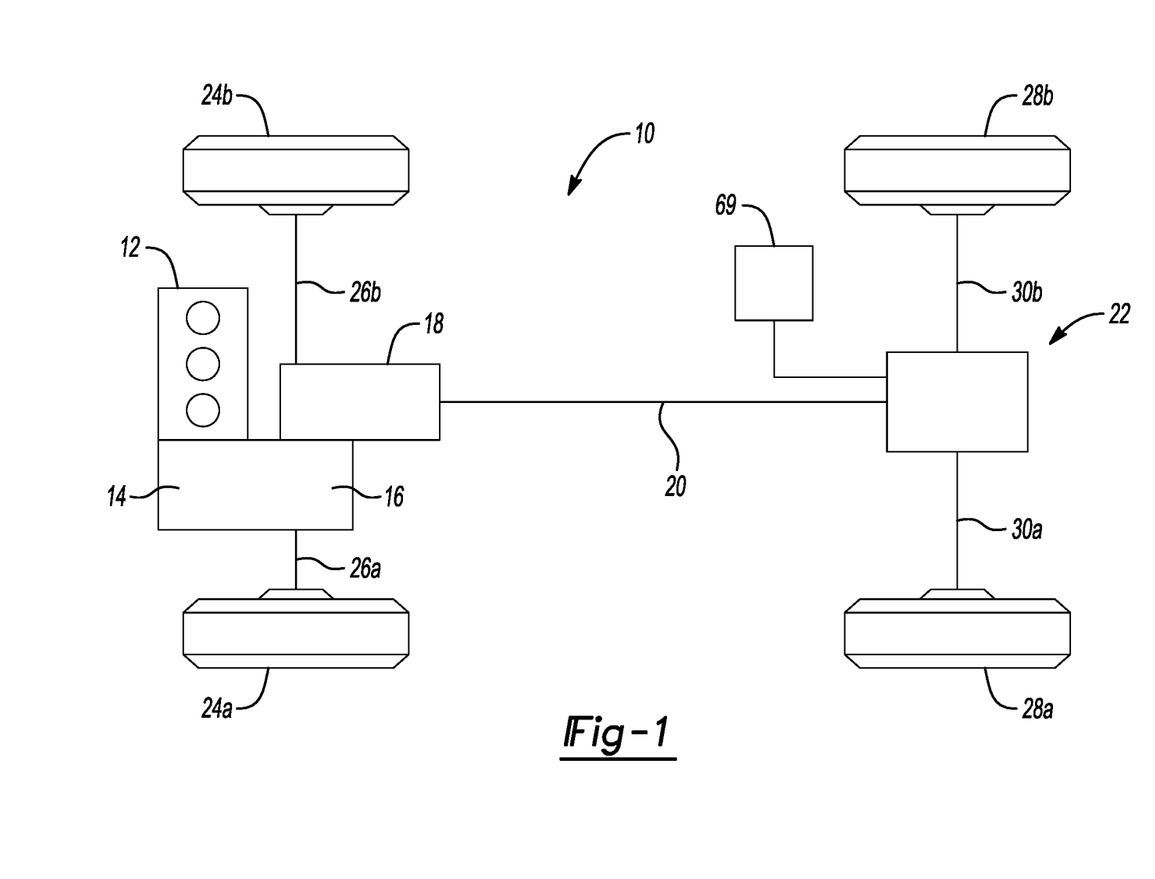
FIG. 1 is a schematic view of a vehicle including a drive unit according to the principles of the present disclosure.

As shown in FIG. 1, a vehicle 10 such as a hybrid electric vehicle is provided. The vehicle 10 includes powertrain components including an internal combustion engine (ICE) 12 and a transmission 14, and drivetrain components including a front axle assembly 16, a power transfer unit 18, a propeller shaft 20 and a rear drive unit 22. The engine 12 drives a set of front wheels 24a, 24b via the transmission 14, the front axle assembly 16, and front drive shafts 26a, 26b. The engine 12 also drives a set of rear wheels 28a, 28b via the power transfer unit 18, the propeller shaft 20, the rear drive unit 22 and rear drive shafts 30a, 30b. The transmission 14 may be a manual gearbox or any type of automatic transmission. The front axle assembly 16 is driveably connected to the set of front wheels 24a, 24b by the front drive shafts 26a, 26b. The front axle assembly 16 also drives the power transfer unit 18, which is connected to the rear drive unit 22 via the propeller shaft 20.

Figure 2:
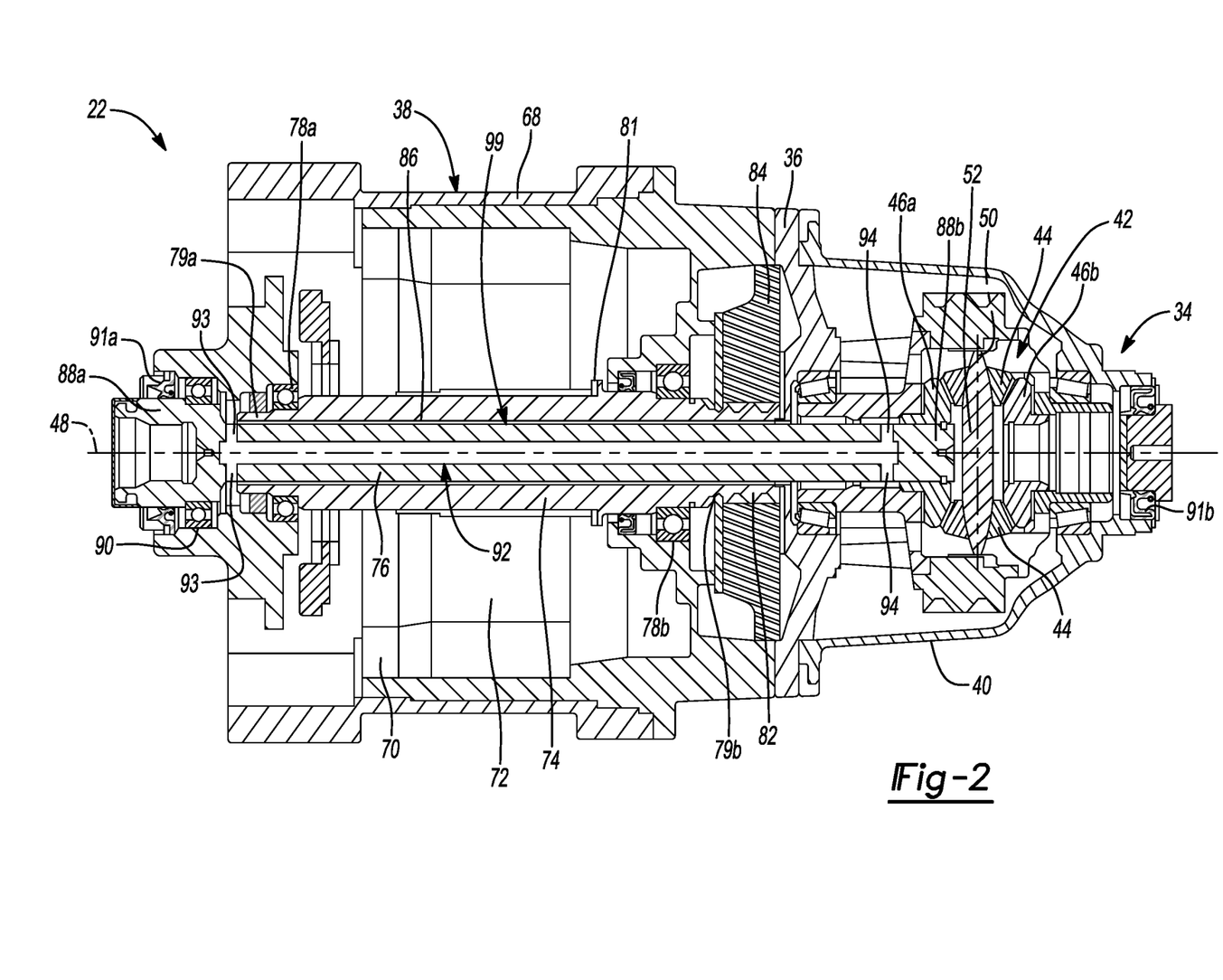
FIG. 2 is a cross-sectional view of the drive unit of FIG. 1.

With reference to FIGS. 1 and 2, the rear drive unit 22 is driveably connected to the set of rear wheels 28a, 28b by the rear drive shafts 30a, 30b. The rear drive unit 22 includes a differential 34, an intermediate plate 36, and a motor assembly 38. The differential 34 includes a differential housing 40 that has a differential gearset 42. In the example shown in FIG. 2, the differential gearset 42 includes a set of pinion gears 44 and a set of side gears 46a, 46b. The set of pinion gears 44 are coupled to the differential housing 40 for common rotating about an axis 48. The set of pinion gears 44 can also rotate relative to the differential housing 40 about their respective rotational axes which, in the example provided, is axis 50 defined by a pinon shaft 52 that the set of pinion gears 44 are rotatably coupled to. The side gears 46a, 46b are meshingly engaged with the set of pinion gears 44 and are rotatable relative to the differential housing 40. Side gear 46a is secured (e.g., splined) for common rotation to an output or link shaft 76 that is drivingly coupled to the rear drive shaft 30a. Side gear 46b is secured (e.g., splined) for common rotation to an output shaft (not shown) that is drivingly coupled to the rear drive shaft 30b. In an alternative example, the differential gearset 42 can be a planetary gearset such that the outputs of the planetary gearset are respectively coupled to the rear drive shafts 30a, 30b.

As shown in FIG. 2, the intermediate plate 36 is disposed between and secured to the differential housing 40 and the motor assembly 38. A first seal (not shown) may be disposed between the differential housing 40 and a first side of the intermediate plate 36 and a second seal (not shown) may be disposed between the motor assembly 38 and an opposing second side of the intermediate plate 36.

Figure 3:
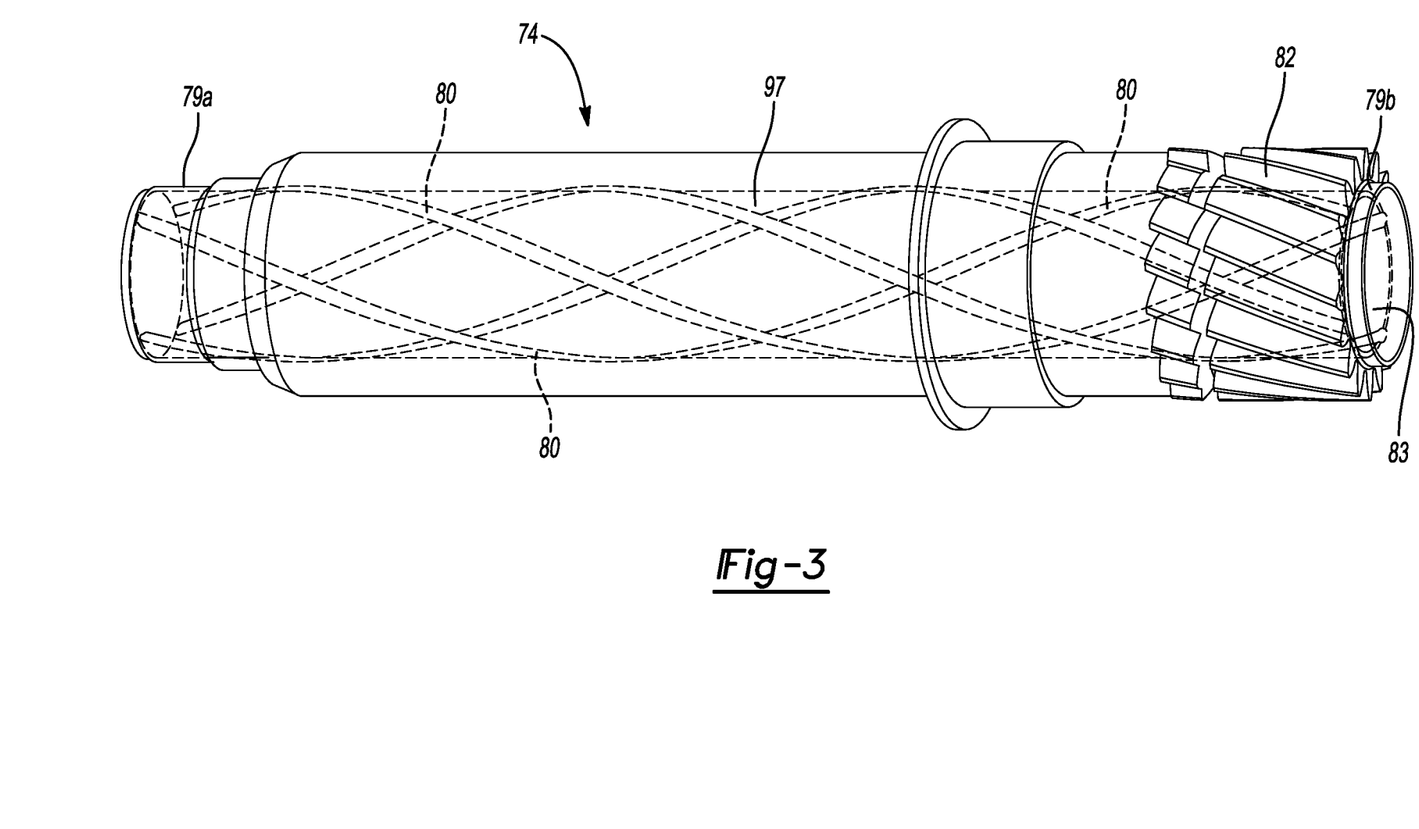
FIG. 3 is a perspective view of a motor shaft of the drive unit of FIG. 1, illustrating internal passages of the motor shaft.
Figure 4:
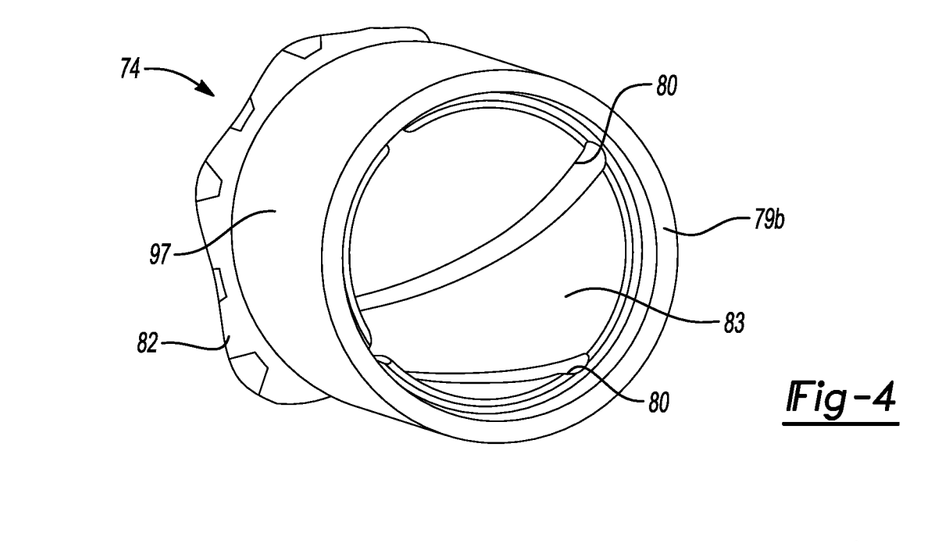
FIG. 4 is a perspective view of an end of the motor shaft of FIG. 3.

The motor assembly 38 may be controlled by an electronic control unit (ECU) 69 (FIG. 1) and includes a casing or housing 68, a stator 70, a rotor 72, a hollow motor shaft 74, and the link shaft 76. The stator 70 may be disposed within the casing 68 and can be non-rotatably coupled to the casing 68. For example, the stator 70 may be press fit into the casing 68. The rotor 72 may be secured onto the motor shaft 74 for common rotation about the axis 48 defined by the link shaft 76. With reference to FIGS. 2-4, the motor shaft 74 is rotatably supported by first and second bearings 78a, 78b disposed at opposing axial ends 79a, 79b, respectively, of the motor shaft 74.

With additional reference to FIG. 3, the motor shaft 74 includes a plurality of helical grooves 80 (FIGS. 3 and 4) extending along and formed in an interior surface 83 of the motor shaft 74. The plurality of helical grooves 80 may extend an entire length of the motor shaft 74. A retaining ring 81 (FIG. 2) is positioned between the motor shaft 74 and the rotor 72 and secures the motor shaft 74 to the rotor 72. Teeth 82 are formed on an outer cylindrical or exterior surface 97 of the motor shaft 74 at or near the axial end 79b. The teeth 82 are meshingly engaged with a reduction gear 84 (FIG. 2) of a reduction gearset. An output gear (not shown) of the reduction gearset rotates the differential housing 40 about the axis 48. The reduction gearset is configured to provide a change in speed/torque between the motor shaft 74 and the differential housing 40 and can be any suitable type of reduction gearset such as a planetary gearset for example.

Figure 5:
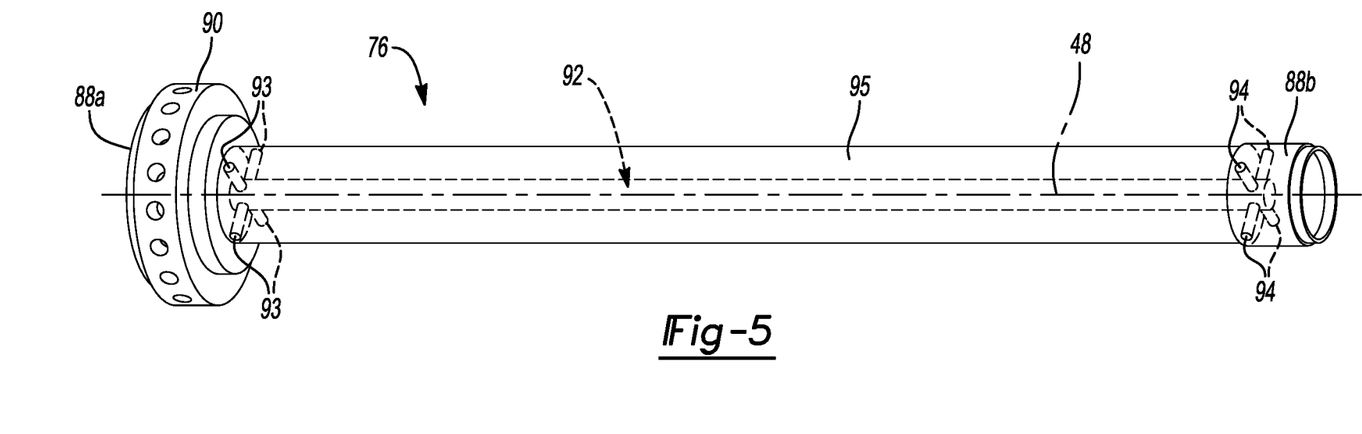
FIG. 5 is a perspective view of a link shaft of the drive unit of FIG. 1, illustrating internal passages of the link shaft.

With reference to FIGS. 2 and 5, the link shaft 76 extends coaxially through the motor shaft 74 and has an exterior surface or outer cylindrical surface 95 that cooperates with interior surface 83 of the motor shaft 74 to define a space 86 therebetween (FIG. 2) along the length of the motor shaft 74. The link shaft 76 is also rotatably supported at a first axial end 88a by a bearing 90. An opposing second axial end 88b of the link shaft 76 is operatively connected to the differential 34 (i.e., the second axial end 88b is secured (e.g., splined) to the side gear 46a of the differential gearset 42). A first seal 91a is positioned axially outwardly along the link shaft 76 relative to the bearing 90 (the first seal 91a is positioned closer toward the first axial end 88a than the bearing 90) and is engaged with the link shaft 76 and the housing 68. A second seal 91b is engaged with the differential housing 40.

The link shaft 76 includes a longitudinal lubricant passageway or lubricant passage 92, a plurality of first connecting lubricant passages or first lubricant passages 93 and a plurality of second connecting lubricant passages or second lubricant passages 94. The lubricant passageway 92 is located at a center of the link shaft 76 and extends parallel to the axis 48 defined by the link shaft 76. A length of the lubricant passageway 92 is greater than a length (measured in a direction parallel to the axis 48) of the plurality of helical grooves 80 (FIG. 3) of the motor shaft 74. The casing 68 of the motor assembly 38 includes an oil sump that contains lubricant (e.g., oil). The lubricant level may be set to the bottom of the link shaft 76.

The plurality of first lubricant passages 93 are in fluid communication with the lubricant passageway 92 and the space 86 formed between the motor shaft 74 and the link shaft 76. That is, the first lubricant passages 93 extend from the lubricant passageway 92 to the outer cylindrical surface 95 of the link shaft 76. In the example shown in FIG. 2, the first lubricant passages 93 extend in a radial direction (i.e., a direction perpendicular to the longitudinal axis 48 of the link shaft 76) from the lubricant passageway 92 to the outer cylindrical surface 95 of the link shaft 76. In some configurations, however, the first lubricant passages 93 may extend at an angle from the lubricant passageway 92 to the outer cylindrical surface 95. The plurality of first lubricant passages 93 are located at the first axial end 88a of the link shaft 76 (i.e., proximate bearing 90) and are circumferentially disposed around the lubricant passageway 92.

The plurality of second lubricant passages 94 are in fluid communication with the lubricant passageway 92 and the space 86 formed between the motor shaft 74 and the link shaft 76 via a cavity of the differential 34. The helical grooves 80 (FIG. 3) are positioned between the first and second lubricant passages 93, 94. The first and second lubricant passages 93, 94 are spaced apart along an axial direction of the axis 48. The second lubricant passages 94 extend from the lubricant passageway 92 to the outer cylindrical surface 95 of the link shaft 76. In the example shown in FIG. 2, the second lubricant passages 94 extend in the radial direction (i.e., a direction perpendicular to the axis 48) from the lubricant passageway 92 to the outer cylindrical surface 95 of the link shaft 76. In some configurations, however, the second lubricant passages 94 may extend at an angle from the lubricant passageway 92 to the outer cylindrical surface 95. The plurality of second lubricant passages 94 are located near or at the second axial end 88b of the link shaft 76 within the differential 34 and are circumferentially disposed around the lubricant passageway 92.

When the vehicle 10 (FIG. 1) is driving in the forward direction, the space 86, the plurality of first and second connecting lubricant passages 93, 94, the helical grooves 80, and the longitudinal lubricant passage 92 form a lubricant circuit 99 (labeled in FIG. 2) configured to permit liquid lubricant received from the sump to enter a first axial end of the space 86, be forced to an opposite axial end of the space 86 by rotation of the helical grooves 80, flow through the plurality of first connecting lubricant passages 93 to the longitudinal lubricant passage 92, and flow axially through the longitudinal lubricant passage 92 to the plurality of second connecting lubricant passages 94. A first portion of liquid lubricant flowing through the second connecting lubricant passages 94 flows to the differential 34 to cool and lubricate components of the differential 34 and a second portion of liquid lubricant flowing through the second connecting lubricant passages 94 returns to the sump. Liquid lubricant flowing through the lubricant circuit cools the bearings 78a, 78b, 90, for example, and internal components of the differential 34. When the vehicle 10 (FIG. 1) is driving in the reverse direction, lubricant may flow through the lubricant circuit in the reverse direction to cool the bearings 78a, 78b, 90 and internal components of the differential 34. The space 86 between the motor shaft 74 and the link shaft 76 is sized such that viscous forces from rotation of helical grooves 80 causes lubricant to flow through the space 86 and the helical grooves 80 when liquid lubricant is forced from the first axial end of the space 86 to the opposite axial end of the space 86. For example, the space 86 may be between 1 millimeter (mm) and 1.5 millimeters (mm).

Referring to FIGS. 1 and 2, when the engine 12 drives the set of rear wheels 28a, 28b, a first power path within rear drive unit 22 transmits power from the engine 12 through the propeller shaft 20, a pinion gear (not shown; e.g., coupled to the propeller shaft 20), a ring gear (not shown; e.g., coupled to the differential housing and meshingly engaged with the pinion gear of the propeller shaft 20), the differential housing 40, the differential gearset 42 to the rear wheel 28a (via the link shaft 76 and the rear drive shaft 30a) and the rear wheel 28b (via the output shaft (not shown) and the rear drive shaft 30b). When the motor assembly 38 drives the set of rear wheels 28a, 28b, a second power path within the rear drive unit 22 transmits power from the rotor 72 of the motor assembly 28 through the motor shaft 74, the reduction gearset (via the reduction gear 84), the differential housing 40, the differential gearset 42 to the rear wheel 28a (via the link shaft 76 and the rear drive shaft 30a) and the rear wheel 28b (via the output shaft (not shown) and the rear drive shaft 30b).

Although the motor assembly 38 is described above as an electric motor, it should be understood that the motor assembly 38 may also operate as an electric generator. When the motor assembly 38 operates as an electric generator, a coupler or clutch (not shown) may disconnect the engine 12 from the motor assembly 38 so that rotational energy from the set of rear wheels 28a, 28b drives the rotor 72 so that the motor assembly 38 can generate electric current to be sent to a battery (not shown). Furthermore, the principles shown and described with respect to the rear drive unit 22 of the vehicle 10 may also be implemented in a vehicle having an electric rear axle drive (eRAD), such as one that does not also receive power from an ICE via a propshaft for example. It should also be understood that the principles disclosed herein with respect to the rear drive unit 22 may also be applicable to the front axle assembly 16 or any other drive unit associated with the vehicle 10.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle driveline component comprising:
   a hollow motor shaft supported for rotation about an axis including a plurality of grooves extending along an interior surface of the motor shaft; and
   a link shaft extending coaxially through the motor shaft and supported for rotation about the axis relative to the motor shaft, an exterior surface of the link shaft cooperating with the interior surface of the motor shaft and the grooves to define a space between the link shaft and the motor shaft, the grooves being configured to force liquid lubricant to flow through the space in a longitudinal direction relative to the link shaft and the motor shaft when the motor shaft rotates, the link shaft including a longitudinal lubricant passage, a first connecting lubricant passage, and a second connecting lubricant passage, the longitudinal lubricant passage extending along a longitudinal direction of the link shaft, the first and second connecting lubricant passages providing fluid communication between the longitudinal lubricant passage and the space, the first and second connecting lubricant passages being spaced apart along an axial direction of the axis.

2. The vehicle driveline component according to claim 1, wherein the plurality of grooves are helical shape.

3. The vehicle driveline component according to claim 2, wherein the plurality of grooves extend an entire length of the motor shaft.

4. The vehicle driveline component according to claim 1, wherein the first connecting lubricant passage is located at a first axial end of the link shaft and the second connecting lubricant passage is located at an opposed second axial end of the link shaft.

5. The vehicle driveline component according to claim 1, wherein the plurality of grooves extend an entire length of the motor shaft and are configured to pump liquid lubricant from one axial end of the motor shaft to an opposite axial end of the motor shaft.

6. The vehicle driveline component according to claim 1, wherein the first and second connecting lubricant passages extend in a radial direction from the longitudinal lubricant passage toward an outer surface of the link shaft.

7. The vehicle driveline component according to claim 1, further comprising an electric motor including a rotor, and wherein the rotor is coupled to the motor shaft for common rotation about the axis.

8. The vehicle driveline component according to claim 1, further comprising:
a housing;
a first bearing rotatably supporting the motor shaft at a first axial end of the motor shaft; and
a second bearing rotatably supporting the motor shaft at a second axial end of the motor shaft that is opposite the first axial end,
wherein liquid lubricant flowing through the space in the longitudinal direction cools the first and second bearings.

9. The vehicle driveline component according to claim 1 further comprising:
a housing;
a bearing rotatably supporting the link shaft at an axial end of the link shaft; and
a seal engaged with the link shaft and the housing, and located axially outwardly along the axial end of the link shaft relative to the bearing.

10. The vehicle driveline component according to claim 1, wherein the lubricant passage is located at a center of the link shaft.

11. A vehicle driveline component comprising:
a hollow motor shaft supported for rotation about an axis and including a plurality of helical grooves extending along an interior surface of the motor shaft; and
a link shaft extending coaxially through the motor shaft and supported for rotation about the axis relative to the motor shaft, an exterior surface of the link shaft cooperating with the interior surface of the motor shaft and the grooves to define a space therebetween, the link shaft including a longitudinal lubricant passage, a plurality of first connecting lubricant passages, and a plurality of second connecting lubricant passages, the longitudinal lubricant passage extending along a longitudinal direction of the link shaft, the plurality of first and second connecting lubricant passages providing fluid communication between the longitudinal lubricant passage and the space,
wherein the space, the plurality of first and second connecting lubricant passages, and the longitudinal lubricant passage form a lubricant circuit configured to permit liquid lubricant received from a sump to enter a first axial end of the space, be forced to an opposite axial end of the space by rotation of the helical grooves, flow through the plurality of first connecting lubricant passages to the longitudinal lubricant passage, flow axially through the longitudinal lubricant passage to the plurality of second connecting lubricant passages, and return to the sump via the plurality of second connecting lubricant passages.

12. The vehicle driveline component according to claim 11, wherein the plurality of first connecting lubricant passages are located at a first axial end of the link shaft and the plurality of second connecting lubricant passages are located at an opposed second axial end of the link shaft.

13. The vehicle driveline component according to claim 11, wherein the plurality of first and second connecting lubricant passages extend in a radial direction.

14. The vehicle driveline component according to claim 11, wherein the plurality of helical grooves are positioned between the plurality of first and second connecting lubricant passages.

15. The vehicle driveline component according to claim 11, wherein the plurality of first and second connecting lubricant passages are circumferentially disposed around the longitudinal lubricant passage.

16. The vehicle driveline component according to claim 11, further comprising:
a housing defining the sump;
a first bearing rotatably supporting the motor shaft at a first axial end of the motor shaft;
a second bearing rotatably supporting the motor shaft at a second axial end of the motor shaft that is opposite the first axial end;
a third bearing rotatably supporting the link shaft at an axial end of the link shaft; and
a seal engaged with the link shaft and the housing, and located axially outwardly along the axial end of the link shaft relative to the third bearing,
wherein liquid lubricant flowing through the space in the longitudinal direction cools the first and second bearings.

17. A vehicle driveline component comprising:
a vehicle component;
a housing defining a sump;
a hollow motor shaft disposed within the housing and supported for rotation about an axis, the hollow motor shaft including a plurality of helical grooves extending along an interior surface of the motor shaft; and
a link shaft disposed within the housing and extending coaxially through the motor shaft, the link shaft supported for rotation about the axis relative to the motor shaft, an exterior surface of the link shaft cooperating with the interior surface of the motor shaft and the helical grooves to define a space between the link shaft and the motor shaft, the grooves being configured to force liquid lubricant to flow through the space in a longitudinal direction relative to the link shaft and the motor shaft when the motor shaft rotates, the link shaft including a longitudinal lubricant passage, a plurality of first connecting lubricant passages, and a plurality of second connecting lubricant passages, the longitudinal lubricant passage extending along a longitudinal direction of the link shaft, the first and second connecting lubricant passages providing fluid communication between the longitudinal lubricant passage and the space, the first and second connecting lubricant passages being spaced apart along an axial direction of the axis, wherein the space, the plurality of first and second connecting lubricant passages, and the longitudinal lubricant passage form a lubricant circuit configured to permit liquid lubricant received from the sump to enter a first axial end of the space, be forced to an opposite axial end of the space by rotation of the helical grooves, flow through the plurality of first connecting lubricant passages to the longitudinal lubricant passage, flow axially through the longitudinal lubricant passage to the plurality of second connecting lubricant passages, and return to the sump via the plurality of second connecting lubricant passages.

18. The vehicle driveline component according to claim 17, wherein the vehicle component is a differential, and wherein the link shaft is operatively connected to the differential.

19. The vehicle driveline component according to claim 17, further comprising:
- a first bearing rotatably supporting the motor shaft at a first axial end of the motor shaft; and
- a second bearing rotatably supporting the motor shaft at a second axial end of the motor shaft that is opposite the first axial end.

20. The vehicle driveline component according to claim 17, further comprising:
- a bearing rotatably supporting the link shaft at an axial end of the link shaft; and
- a seal engaged with the link shaft and the housing, and located axially outwardly along the axial end of the link shaft relative to the bearing.

* * * * *